United States Patent [19]

Keskkula et al.

[11] 4,243,765
[45] Jan. 6, 1981

[54] IMPACT-RESISTANT POLYMERS AND RUBBER CONCENTRATES THEREFOR

[75] Inventors: Henno Keskkula; Frederick A. Miller, both of Midland, Mich.

[73] Assignee: The Dow Chemical Company, Midland, Mich.

[21] Appl. No.: 755,319

[22] Filed: Dec. 29, 1976

[51] Int. Cl.³ .................................................. C08F 279/04
[52] U.S. Cl. ..................................................... 525/86
[58] Field of Search ....................... 260/876 R, 880 R; 525/86

[56] References Cited

U.S. PATENT DOCUMENTS

| | | | |
|---|---|---|---|
| 3,703,491 | 11/1972 | Takayama | 260/876 R |
| 3,751,526 | 8/1973 | Okasaka | 260/880 R |
| 3,855,355 | 12/1974 | Moore | 260/880 R |
| 3,963,807 | 6/1976 | Howe | 260/876 R |
| 4,009,226 | 2/1977 | Ott | 260/876 R |
| 4,009,227 | 2/1977 | Ott | 260/876 R |

Primary Examiner—Paul R. Michl
Attorney, Agent, or Firm—R. B. Ingraham

[57] ABSTRACT

Rubber concentrates for use in reinforcing acrylonitrile and styrene-containing polymers are prepared by graft polymerizing an acrylonitrile-styrene polymer on a rubber latex wherein a portion of the polymer is chemically combined with the rubber and a portion of the acrylonitrile-styrene polymer is not chemically combined. The uncombined or matrix polymer is of relatively low molecular weight.

6 Claims, No Drawings

IMPACT-RESISTANT POLYMERS AND RUBBER CONCENTRATES THEREFOR

Rubber-reinforced polymers, particularly those containing styrene-acrylonitrile and a reinforcing rubber, are well known and are prepared by a variety of methods. The simplest method for the preparation of such polymers is to admix a latex of an acrylonitrile-styrene resin with a latex of a rubber, coagulate the resultant mixture and malaxate the dried coagulum at a heat-plastification temperature. Alternatively, such polymers are prepared by mechanically admixing heat-plastified reinforcing rubber with heat-plastified resin; and another method for the preparation of such polymers is to polymerize styrene and acrylonitrile in the presence of rubber, for example, by mass or bulk polymerization to obtain a rubber-reinforced styrene-acrylonitrile resin. Rubber-reinforced styrene resins usually fall into two broad categories: the so-called ABS resins which typically contain styrene and acrylonitrile in about a 3 to 1, ratio by weight, and the so-called nitrile barrier resins which usually contain styrene and acrylonitrile in about a 1 to 3 ratio by weight. The ABS resins invariably contain a reinforcing rubber and the so-called barrier resins optionally contain a reinforcing rubber depending upon the intended end-use application. In view of the wide variety of end-use applications for both ABS resins and rubber-reinforced barrier resins wherein different applications frequently require a different combination of physical properties, it is advantageous to prepare such polymers in such a manner that the reinforcing rubber level may be readily varied. Generally reinforcing-rubbers can be blended with a resin to be reinforced, however, in most instances as the level of rubber is increased, the melt viscosity of the resin increases very sharply thus providing a very practical limit to the rubber content because of the difficulty of fabricating such materials. The blending technique of preparing rubber reinforced resins is particularly desirable in that it readily permits the rubber level to be varied to obtain the desirable physical properties without the necessity of adjusting complex polymerization conditions in order to optimize such properties for a particular reactor or polymerization system. Further, when employing the blending technique, the size of the rubber particles or elastomeric reinforcement may be predetermined and any desired distribution may be obtained by employing reinforcement materials having the appropriate size or sizes. It is well known and established that for optimum reinforcement of a polymer system, such as copolymers of styrene and acrylonitrile, that it is desirable that some styrene-acrylonitrile polymer be chemically attached to the reinforcing rubber.

It would be desirable if there were available an improved rubber concentrate for the preparation of rubber-reinforced copolymers containing styrene and acrylonitrile in a proportion of from about 80 to 25 parts by weight of styrene and 20 to 75 parts by weight of acrylonitrile, the rubber concentrate comprising a plurality of diene-rubber particles having chemically attached thereto an attached styrene-acrylonitrile polymer, the attached styrene-acrylonitrile polymer being in admixture with a copolymer of acrylonitrile and styrene at least approximating the chemical composition of the attached styrene-acrylonitrile polymer, with the further limitation that the copolymer of acrylonitrile and styrene, chemically unattached to the diene rubber, has an intrinsic viscosity of from about 0.15 to about 0.5 deciliters per gram as determined in a solution of a 2 to 1 by volume mixture of acetonitrile and dimethyl formamide at 25° C., and the number average diameter of the diene-rubber particles lie between about 500 Angstroms and 2800 Angstroms and that the ratio of the chemically attached or graft styrene-acrylonitrile polymer to diene rubber lie between about 0.1 and 1.0.

Also contemplated within the scope of the present invention is a mechanical blend of the hereinbefore delineated rubber concentrate and a copolymer of from about 20 to 75 parts by weight of acrylonitrile and 80 to 25 parts by weight of styrene, optionally containing a second reinforcing rubber.

A preferred diene rubber latex component used to provide the polymerized diene rubber of the graft copolymer is one having a majority of the particles in the latex of a size between about 500 and about 2,800 Angstroms, and preferably from about 500 to about 2000 Angstroms. An example of a particularly preferred diene rubber latex is one having particles ranging in size from 700 to 1500 Angstroms with a predominant portion of the particles in the 900 to 1100 Angstroms range; the foregoing values being number average values. As is well known, the particle size of the diene rubber latex may be varied over a wide range by appropriate changes in the polymerization recipe. If, for example, the soap concentration of the reaction mixture is high, a large number of particles are formed during polymerization. This gives rise to a fast polymerization reaction and results in the production of a latex having relatively small particles. On the other hand, if the soap concentration of the reaction mixture is low, a small number of particles are formed on polymerization. This gives rise to a slow polymerization reaction and results in the production of a latex having relatively large particles.

The diene rubber latex used in accordance with this invention may be, for example, a latex of a synthetic rubber prepared by the polymerization of monomers such as butadiene and/or isoprene with or without the addition of substantial but minor proportions of acrylonitrile, methacrylonitrile, styrene, methyl styrene, alphamethyl styrene, alkyl acrylates and methacrylates such as methyl methacrylate, ethyl acrylate and the like. Suitable cross-linking monomers, such as, for example, divinylbenzene and the like may be incorporated therein. Suitable non-cross-linking monomers may be used, such as for example, monoethylenic and conjugated diethylenic unsaturated compounds, such as vinyl acetate, vinylidine chloride, vinyl stearate, vinyl naphthalene, methyl vinyl ether and the like.

The polymerized diene rubber constituent of the graft copolymer is prepared in the following manner. A conjugated diolefin, such as butadiene or isoprene together with suitable cross-linking or non-cross-linking comonomers is emulsified in water with the aid of micelle-forming emulsifying agents. The polymerization mixture usually contains a suitable water soluble free radical-generating catalyst such as a peroxide, or a persulfate. In addition, a modifier or regulator, such as a mercaptan, may be present in small amounts. The modifier acts as a chain transfer agent and limits the growth of the polymer chains. Polymerization is carried out under suitable conditions such as, for example, from about 0° C. to about 100° C. and autogenous pressure until a substantial portion (preferably in excess of 80%) of the conjugated diolefin is polymerized. The unreacted monomers optionally may be removed from the latex prior to the graft polymerization step by any of the conventional monomer removal methods.

Emulsifying agents for the preparation of rubber latex and the rubber concentrates of the present invention which may be used in the aqueous emulsion polymerization process include the soaps, such as sodium and potassium myristate, laurate, palmitate, oleate, stearate, resinate, and hydroabietate; alkali metal salts of alkyl, alkylene, alkyl aryl sulfonates or sulfates, such as sodium and potassium salts of lauryl sulfate, cetyl sulfate, oleyl sulfonate, stearyl sulfonate, sulfonated castor oil, dodecylbenzene sulfonate, alkyl esters of sulfosuccinic acid sodium salts as well as ammonium salts thereof; and salts of higher amines such as lauryl amine hydrochloride and stearyl amine hydrobromide, alkyl phosphates, alkoxyphosphates and the like. Nonionic surface active agents may be used in combination with the above named emulsifying agents.

Suitable molecular weight modifiers, such as the alkyl and cycloalkyl mercaptans, including n-dodecyl mercaptan, t-dodecyl mercaptan, halohydrocarbons and the like, may be employed in the polymerization step in amounts of from about 0.5 percent to about 10 percent by weight based on the total weight of monomeric material. Among the compounds particularly desirable for the practice of the present invention as molecular weight modifiers are n-octyl mercaptan, cyclohexyl mercaptan, dipentene dimercaptan, n-butyl mercaptan, n-dodecyl mercaptan, tertiary dodecyl mercaptan, iso-octyl thioglycolate, pinanyl mercaptan, pentaerythritol-tetra(3-mercapto propionate), ethyl cyclohexyl dimercaptan, allyl bromide, carbontetrachloride, bromotrichloromethane and $\beta$-bromostyrene. Other compounds which are useful as molecular weight modifiers in the present invention include: methyl mercaptan, ethyl mercaptan, 1-propyl mercaptan, 2-propyl mercaptan, 1-butyl mercaptan, 2-butyl mercaptan, 1-pentyl mercaptan, 2-pentyl mercaptan, 3-pentyl mercaptan, 1-hexyl mercaptan, 1-heptyl mercaptan, tertiary nonyl mercaptan, n-decyl mercaptan, secondary undecyl mercaptan, secondary dodecyl mercaptan, and terpenes such as terpinolene and limonene and mixtures of the foregoing regulators.

Suitable initiators or catalysts include water-soluble peroxy compounds and water-soluble redox systems, preferably potassium, sodium or ammonium peroxydisulphate or hydrogen peroxide, in combination with a reducing agent, such as sodium metabisulphite, sodium thiosulfate, sodium bisulphite, sodium formaldehyde sulfoxylate, sodium dithionite, sodium hypophosphite, ferrous sulfate, ferrous nitrate, water-soluble amines, for example, triethylamine, triethanolamine, which acts as an accelerator. Oil soluble initiators such as cumene hydroperoxide, azobisisobutyronitrile, tertiarybutyl hydroperoxide, paramenthanehydroperoxide, benzoyl peroxide and the like may be used.

The quantity of catalyst used is within the limits considered normal for polymerization reactions of this kind, i.e., between 0.01 and 5% by weight, based on the total monomer.

Other modifiers, including plasticizers, stabilizers, lubricants, dyes, pigments, and fillers may be added during the polymerization process, provided they do not chemically react with or otherwise adversely affect the ingredients of the reaction mixture. Otherwise, these modifiers may be added following polymerization. Examples of other modifying agents and pigments which may be added are wood flour, wood fiber, paper dust, clay, glass wool, glass fiber, mica, granite dust, silk flock, cotton flock, steel wool, cloth, sand, carbon black, titanium dioxide, zinc oxide, lead oxide, chrome yellow, gums, oils, waxes, and the like.

Other compounding ingredients, such as extenders, stabilizers, colors and the like, may be used in preparing the compositions of this invention as is well known in the art so long as the balance between impact strength, flexural strength, tensile strength, processability, heat distortion temperature and the like are not affected to such a degree that the composition is no longer useful as a tough, rigid thermoplastic product.

The product of the aqueous emulsion polymerization is usually a latex. The copolymers may be recovered from the latex by any suitable means, such as by coagulation with electrolytes or solvents, by freezing, spray drying, mechanical coagulation and the like.

Rubber concentrates prepared in accordance with the present invention are applicable to a wide variety of polymers ranging from the so-called barrier resins which typically have an acrylonitrile content in the range of 70 percent to the so-called styrene-acrylonitrile resins which after have a styrene content of about 75 percent and acrylonitrile content of about 25 percent. In order to prepare optimum blends in accordance with the present invention, it is generally desirable that the composition of the superstrate on the grafted rubber particle approximate the composition of the resin being reinforced whether it be a barrier resin, a styrene-acrylonitrile resin or a so-called ABS resin which generally is a rubber reinforced styrene-acrylonitrile resin. In general, the graft-to-rubber ratio optimum for barrier resins is from about 0.1 to 0.6; while the graft-to-rubber ratio for styrene-acrylonitrile resins is from about 0.1 to 0.8. The graft-to-rubber ratio suitable for compositions of intermediate acrylonitrile compositions lie between the values for the barrier resins and the styrene-acrylonitrile resins, as the optimum graft-to-rubber ratio is generally a function of the acrylonitrile content. In order to obtain desirable characteristics of compositions in accordance with the invention, it is essential that the hereinbefore graft ratio be maintained and that the matrix polymer of the grafted rubber concentrate be of low molecular weight. By the term "matrix polymer" is meant the styrene-acrylonitrile copolymer which can be solvent extracted from the rubber concentrate. Such matrix polymer should have an intrinsic viscosity of between about 0.15 to about 0.5 deciliters per gram as determined by measuring the viscosity matrix polymer in a two-to-one by volume of acetonitrile and dimethyl formamide at 25° C. Generally for polymers having an acrylonitrile content of 50 to 75 parts of acrylonitrile and 50 to 25 parts of styrene, a reinforcing rubber concentrate of from about 500 to 1500 Angstroms is desirable while for styrene-acrylonitrile polymer containing 20 to 35 parts acrylonitrile and 80 to 65 parts styrene the concentrate particle diameter preferred is 1000 to 2800 Angstroms. Beneficially rubber reinforced styrene-acrylonitrile (ABS) polymers contain up to 15 parts by weight of a particulate rubber are reinforced by addition of rubber concentrates in accordance with the invention. When the foregoing limitations are maintained, highly desirable reinforced polymer blends are obtained which exhibit excellent impact resistance and surprisingly low melt viscosities. Polymer blends in accordance with the present invention are readily fabricated into a wide variety of articles including: sheets, injection molded articles, and the like. Beneficially, polymers containing high proportions of acrylonitrile exhibit excellent gas and vapor barrier properties as well as desirable physical properties such as tensile strength, impact resistance, flexural strength, resistance to solvent, and the like.

The compositions of this invention have excellent processing characteristics, and they may be extruded, calendered, molded, drawn, embossed, machined and otherwise treated to form colorless, translucent and in some cases transparent, useful, rigid, shock-resistant products and articles which have an excellent balance of good chemical, physical and electrical properties.

Rubber concentrates in accordance with the present invention are generally transparent or at least translucent and show little or no tendency to exhibit crazing or whitening when a compression-molded sheet is folded 90 and sometimes 180°. Such rubber concentrates can be injection molded, compression molded, extruded as rods, films or sheet and formed into such useful items such as tubs, lids, boxes, overwrapping films, as well as convoluted sheet useful as dunnage for delicate articles and many other applications as is obvious to those skilled in the plastic fabrication art.

The blends of this invention may be used to good advantage to make all sorts of useful extruded or molded (injection or compression) shapes, such as sheets, rods, tubes and the like, as well as milled or calendered sheets or the like which can also be afterformed by vacuum drawing or similar operations. They may be expanded by incorporating blowing agents and heating. Expanded and unexpanded sheets may be laminated. The compositions of this invention may be substituted to great advantage for the usual rubber or plastic compositions, or even for metals, wood or other materials, in many applications where toughness and resistance to creep and distortion at elevated temperatures are required. The resins are particularly useful in the production of articles and implements which must be subjected to relatively high heat for relatively long times, such as medical instruments and the like. Thus, the present compositions may be used to fabricate parts for machines, such as gears and cams; parts for textile machinery such as bobbins, shuttles, pickers, etc.; containers and pipes, especially for chemical and like operations where resistance to corrosive substances is desired, as in filter press plates and tumbling barrels for plating operations, electrical parts, such as terminal blocks, telephones, and protective casing for cable joints; as well as tote boxes and trays, luggage, radio cabinets, furniture, phonograph records, signs, small boat hulls and decks, paneling or covering for walls and surfaces of buildings, railroad cars or ships; protective armor including body armor; automobile parts such as headliners, steering wheels, door panels, and seat parts; roller skate wheels, protective helmets, packaging material for foods, drugs and cosmetics, including pressurized bottles and similar containers, printing plates, tools, die cutting blocks, washing machine parts such as covers, baskets, bearings and impellers; and numerous other articles as will be evident to those skilled in the art. The compositions of this invention may be laminated or otherwise reinforced as with fibers, fabrics or wire mesh if desired in making the foregoing or other articles although frequently the strength of these materials will be adequate without reinforcement.

EXAMPLE I

A plurality of rubber latexes designated Series A are prepared in the following manner:

An agitated reaction vessel was charged with 186 parts by weight of deionized water, 0.2 part by weight sodium lauryl sulfate in 0.4 part of water, 0.05 part by weight of sodium persulfate, 0.1 part by weight sodium bicarbonate and 0.15 part by weight of tertiary dodecyl mercaptan at a temperature of about 30° C. The reactor was closed and the temperature raised to 40° C. The reactor was purged to remove oxygen by pressurizing to 70 pounds per square inch gauge with nitrogen and evacuating the reactor to a pressure of about 10 millimeters of mercury. The purging procedure was then repeated. Into the evacuated agitated reactor was then introduced a mixture of 75 parts by weight of 1,3-butadiene, 15 parts by weight of styrene and 10 parts by weight of acrylonitrile. With agitation, the reaction was then heated to 65° C. After 5 hours, or when the reactor pressure decreased by 10 pounds per square inch from the maximum pressure, a solution of 2 parts by weight sodium lauryl sulfate in 32 parts by weight of deionized water was added. After an additional 9 to 15 hour period when no rapid pressure change occured in the reactor indicating the rate of polymerization had reached a low value, the latex was removed from the reactor and stripped of residual monomers by steam stripping. The rubber latexes had particle sizes of about 1,000 to 1,200 Angstroms. The latexes show a gel content in toluene of about 95 percent.

Rubber concentrates were prepared employing the Series A rubber latex in the following manner:

A jacketed reactor fitted with an agitator was charged to contain 243 parts by weight water, one-half part by weight of sodium lauryl sulfate, 66 parts by weight of rubber latex solids, 0.4 part by weight of acetic acid and 0.060 part by weight sodium hydroxide. The components were supplied to the reactor at room temperature with agitation in the recited order. The reactor contents had a pH of 4. The reactor was closed and heated with agitation to 50° C. Most of the residual oxygen was removed by pressurizing the reactor to 25 pounds per square inch gauge with nitrogen, subsequently evacuating to provide a vacuum of 25 inches of mercury. The reactor was purged three times in this manner. Six parts by weight of acrylonitrile were added and then a solution of 0.20 part of sodium formaldehyde sulfoxylate, commercially available under the trade designation of Formopon, in five parts by weight of water. Five minutes after the addition of the Formopon solution, a monomer mixture was added to the reactor over a period of four and one-half hours. The monomer mixture was 65.8 parts by weight acrylonitrile, 28.2 parts by weight styrene together with varying amounts of normal octyl mercaptan. Ten minutes after the addition of the water-Formopon mixture, 0.020 part by weight of sodium persulfate in 5.4 parts by weight of water were added and at this time an aqueous solution consisting of 92 parts by weight of water, one part by weight of sodium lauryl sulfate, and 0.040 part by weight of sodium persulfate was pumped to the reactor and pumping continued for 4.4 hours. At the time of addition of the Formopon-water solution, heating of the reactor was initiated and the temperature raised from 50° to 70° C. over a two-hour period. When the monomer addition was completed, the following solution was added: 4 parts by weight of water, 0.02 part by weight of the tetrasodium salt of ethylene diamine tetraacetic acid and 0.010 part by weight of the monomethyl ether of hydroquinone. The resultant latex was steam-stripped to remove residual monomer and was coagulated with dilute aqueous aluminum sulfate at 80° C. The polymer was then water-washed and dried in an air circulating oven at 60° C.

The rubber concentrates after drying were compounded on 3×8 inch compounding rolls employing 265 pounds per square inch gauge steam pressure for three minutes (after all material was on the rolls) to provide a one hundred gram rubber concentrate blanket. The rubber concentrate blanket was compression molded in a platen press, heated at platen temperatures within the range of 190° to 200° C. The blanket within the mold was heated for a period of three minutes and subsequently a pressure of about 30 tons was applied for about two minutes. Physical properties of the moldings were determined and portions of the molding ground for the determination of rheological properties at 200° C. by means of an Instron rheometer. The properties of the rubber concentrates are set forth in Table I as well as the rubber concentration, amount of normal octyl mercaptan employed, graft to rubber ratio, the intrinsic viscosity of the soluble matrix polymer and its percent acrylonitrile. The tensile strengths, both yield and rupture are set forth as well as the modulus and notched Izod impact resistance value. The yield elongation for the samples was from about 5 to 4.8 percent and the rupture elongation was in excess of 30 percent.

The amount of graft polymer was determined by dissolving a one-half gram sample in 38.5 milliliters of solvent, the solvent being one part by volume of dimethylformamide and two parts by volume of acetonitrile. The solution was centrifuged in tubes for 90 minutes. The amount of soluble fraction (matrix polymer) and its intrinsic viscosity were determined from the supernatant liquid. The amount of gel phase was determined by subtracting the weight of the soluble fraction from the total polymer sample weight. The weight of the graft copolymer phase was determined as the weight of the gel phase minus the calculated weight of rubber contained in the one-half gram sample.

Acrylonitrile level in the polymer was determined by the Kjeldahl procedure.

by the addition of the styrene-acrylonitrile polymer. The resulting blanket on the rolls was folded frequently during the five minute period. Test specimens were prepared by compression molding portions of the blanket for three minutes at 190° C. Gardner impact strengths were determined using 2 by 2 inch square test specimens cut from a forty-mil thick molding. The Gardner drop tester was employed without the hole reducing insert.

TABLE II

| PROPERTIES OF RUBBER CONCENTRATE BLENDS | | | |
|---|---|---|---|
| Rubber Concentrate Ref. | % Rubber in Blend % | Gardner Impact | |
| | | Failed % | Energy in-lbs |
| 1A | 14 | 58 | 70 |
| 1B | 22 | 7 | 80 |
| 2A | 14 | 43 | 80 |
| 2B | 22 | 7 | 80 |
| 3A | 14 | 50 | 40 |
| 3B | 22 | 21 | 80 |
| 4A | 14 | 29 | 36 |
| 4B | 22 | 64 | 64 |
| 5A | 14 | 45 | 80 |
| 5B | 22 | 38 | 70 |

EXAMPLE II

A plurality of rubber latexes designated Series B were prepared in the following manner: An agitated vessel was charged to contain 186 parts by weight of water, 0.30 part by weight of sodium di-2-ethylhexyl sulfosuccinate, commercially available under the trade designation of Aerosol OT, 0.05 part by weight of sodium persulfate, and 0.10 part by weight of sodium bicarbonate. The reactor was charged with agitation at 30° C. The reactor was closed and heated to 40° C. and purged three times employing the following procedure: pressurize with nitrogen to 25 pounds per square inch gauge and evacuate to a vacuum of 26 inches of mercury. When the purging procedure was completed, the following components were added to the reactor: acrylonitrile—10 parts by weight, styrene—15 parts by weight, butadiene—75 parts by weight, and tertiary dodecyl mercaptan—0.75 part by weight. The contents of the reactor were then heated to 60° C. The maximum reactor pressure was noted and when this pressure had reduced in value by about 10 pounds per square inch, usually after a period of about five to seven hours, the following mixture was added: 28 parts by weight of water, 3 parts by weight of Gafac RE 610, which is a mixture of R—O—(CH$_2$CH$_2$O—)$_n$PO$_3$H$_2$ and [R—O—(CH$_2$CH$_2$O—)$_n$]$_2$PO$_2$H, wherein n is a number of from 1 to 40, R is an alkaryl group and preferably a

TABLE I

| PROPERTIES OF RUBBER CONCENTRATES | | | | | | | | | |
|---|---|---|---|---|---|---|---|---|---|
| | Rubber Concentrate | | | | | | | | |
| Ref. | Rubber % | n-octyl Mercaptan p/100 p monomer | Graft Rubber | Matrix | | Tensile psi | | Modulus psi × 10$^5$ | Notched Izod ft-lbs/in[1] |
| | | | | [η] | AN % | Yield | Rupture | | |
| 1 | 45.5 | 4.0 | .30 | .274 | 66.5 | 3400 | 3000 | 1.6 | 7.9 |
| 2 | 45.5 | 3.0 | .34 | .339 | 69.2 | 3600 | 3300 | 1.8 | 7.3 |
| 3 | 44.4 | 2.0 | .51 | .422 | 69.4 | 4100 | 3700 | 1.9 | 5.0 |
| 4 | 47.2 | 1.0 | .59 | .731 | 65.9 | 4200 | 3900 | 1.9 | 2.0 |
| 5 | 46.2 | 0.5 | .66 | .770 | 63.7 | 4300 | 3500 | 2.0 | 3.0 |

[1]foot pounds per inch

Blend Preparation

Blends of the rubber concentrates of Table I with a styrene-acrylonitrile emulsion polymer containing 68.1% acrylonitrile and having an intrinsic viscosity of 0.628 deciliters per gram in dimethylformamide were prepared by blending on 3×8 inch compounding rolls heated with steam at a pressure from about 250 to about 265 pounds per square inch gauge for a period of about 5 minutes after addition of the polymers to the rolls. The rubber concentrate was added to the rolls followed nonyl phenyl group, which composition is sold by the GAF Corporation, and 0.28 part by weight of sodium hydroxide. The solution had a pH of about 8. The reaction was continued until the reactor pressure approached zero pound per square inch gauge. The resultant latexes showed 75 percent gel in toluene and a gel-swelling index of about 30 and a particle size as determined by electron microscopy of about 1200 Angstroms. Rubber concentrates were prepared using the latex rubbers of Series B in the following manner: an agitated jacketed reactor was charged at room temperature with agitation to contain 250 parts by weight of water, 0.50 part by weight Gafac RE 610, 0.20 part by weight of acetic acid, 66.67 parts by weight of rubber latex solids and 0.29 part by weight of phosphoric acid. The resultant mixture had a pH of 3. The reactor was closed and the contents heated to 50° C. When the contents had reacted 50° C. the reactor was purged to remove oxygen by pressurizing with nitrogen to 40 pounds per square inch gauge and evacuating to a vacuum of 26 inches of mercury. Purging was done three times. When purging was completed, six parts by weight of acrylonitrile were added to the reactor. After the addition of acrylonitrile, the following solution was added to the reactor continuously over a period of four and one-half hours: water—92 parts by weight, Gafac RE 610—2.5 parts by weight, sodium hydroxide 0.03 part by weight, Formopon—0.15 part by weight. The solution had a pH of 5.7. Five minutes after the start of the addition of the preceding solution, the following monomer mixture was pumped into the reactor continuously over a period of four hours: acrylonitrile—53.6 parts by weight, styrene—40.4 parts by weight containing varying amounts of normal octyl mercaptan. Ten minutes after the acrylonitrile-styrene-mercaptan mixture was started into the reactor, a solution of 0.2 part by weight of sodium persulfate in 3.3 parts by weight of water was added. Heating of the contents of the reactor was initiated when pumping of the water, Gafac, sodium hydroxide, Formopon mixture was initiated and the temperature of the reactor contents was raised to 60° C. over a period of one hour. On completion of the addition of the acrylonitrile-styrene mixture, the following solution was added to the reactor: 4 parts by weight of water, 0.2 part by weight of the tetrasodium salt of ethylene diamine tetraacetic acid and 0.1 part by weight of the monomethyl ether of hydroquinone. On completion of the addition of the aqueous solution of water, Gafac, sodium hydroxide and Formopon, steam stripping of residual monomer was initiated. The resultant latex was coagulated with aluminum sulfate, filtered, washed, and the resin dried in a circulating air oven at 60° C. In all cases, the conversion of styrene and acrylonitrile monomer to polymer was about 90 percent.

The rubber concentrates were prepared in the hereinbefore disclosed manner with rubber latexes of Series B, were blended with a mass polymerized acrylonitrile-styrene polymer having 52 weight percent acrylonitrile and the remainder styrene polymerized therein. The acrylonitrile-styrene polymer had an intrinsic viscosity of 0.652 deciliter per gram as measured in a 2 to 1 by volume solution of acetonitrile and dimethylformamide at 25° C. The acrylonitrile-styrene polymer and rubber concentrate were blended to provide blends containing about 13 and about 17 percent by weight rubber. The results are set forth in Table III.

TABLE III

| Ref | Rubber Concentrate | | | | | Rubber in SAN[2] % | Tensile psi[1] | | Elong Rupture % | Notched Izod ft-lbs/in | Gardner Impact | |
|---|---|---|---|---|---|---|---|---|---|---|---|---|
| | Rubber % | n-octyl mercaptan | Graft Rubber | Matrix $[\eta]$ | AN % | | Yield | Rupture | | | Failed % | Energy in-lbs |
| 6A | 43.8 | 4.0 | 0.46 | .223 | 51.0 | 13.1 | 8500 | 6900 | 16 | 0.54 | 40 | 80 |
| 6B | | | | | | 17.5 | 7300 | 5400 | >33 | 3.2 | 40 | 80 |
| 7A | 43.8 | 3.0 | 0.56 | .278 | 50.6 | 13.1 | 8500 | 6100 | 23 | 0.67 | 0 | 50 |
| 7B | | | | | | 17.5 | 7600 | 5900 | 28 | 0.92 | 30 | 80 |
| 8A | 43.8 | 2.5 | 0.60 | .293 | 51.5 | 13.1 | 8300 | 6300 | 27 | 0.84 | 40 | 40 |
| 8B | | | | | | 17.5 | 7500 | 5200 | 18 | 1.15 | 10 | 50 |
| 9A | 44.0 | 0.8 | 0.82 | .487 | | 13.2 | 8800 | 7100 | 14 | 0.57 | 40 | 40 |
| 9B | | | | | | 17.6 | 7100 | 6000 | 15 | 0.94 | 0 | 40 |
| 10A | 44.0 | 0.1 | 1.04 | .790 | | 13.2 | 8800 | 7100 | 13 | 0.57 | 50 | 30 |
| 10B | | | | | | 17.6 | 8000 | 6100 | >33 | 1.0 | 0 | 60 |

[1]Yield elongation 4%; Modulus (about 13% rubber) 4.2–4.6 × 10⁵ psi, (about 17% rubber) 3.4–3.9 × 10⁵ psi.
[2]Mass polymerized styrene-acrylonitrile polymer
AN = acrylonitrile
SAN = styrene-acrylonitrile copolymer.

All of the compositions of Table III were generally transparent.

EXAMPLE III

A plurality of rubber concentrates were prepared employing latexes of Series A in the following manner: an agitated jacketed reactor was charged at room temperature to contain 249 parts by weight of water, 0.5 part by weight of sodium lauryl sulfate, 66.7 parts by weight of rubber latex solids, 0.3 part by weight of acetic acid and 0.025 part by weight of sodium hydroxide. The resultant mixture had a pH of 4. The reactor was sealed and heated to 45° C. Residual oxygen was purged by pressurizing to 40 pounds per square inch gauge nitrogen and the pressure reduced to provide a vacuum of 26 inches of mercury. The reactor was purged three times in this manner. Six parts by weight of acrylonitrile were added, and at the time of the acrylonitrile addition, flow of an aqueous mixture was initiated. The aqueous mixture contained 92.1 parts by weight of water, 2.15 parts by weight of sodium lauryl sulfate and 0.045 part by weight Formopon. The aqueous mixture was added continuously over a period of four and one-half hours. Five minutes after the addition of acrylonitrile to the reactor, pumping of the following monomer mixture into the reactor was started. The monomer mixture was 32.9 parts by weight of acrylonitrile, 61.1 parts by weight of styrene containing varying amounts of normal octyl mercaptan. Ten minutes after the addition of six parts by weight of acrylonitrile, a solution of 0.06 part by weight sodium persulfate and four parts by weight of water was added. With the addition of 6 parts acrylonitrile to the reactor, heating was started and the temperature of the contents of the reactor raised from 45° C. to 60° C. over a period of one hour. On completion of the addition of the aqueous mixture of sodium lauryl sulfate and Formopon, the following solution was added to the reactor: 4 parts by weight of water, 0.02 part by weight of the tetrasodium salt of ethylene-diaminetetraacetic acid and 0.01 part by weight of the monomethyl ether of hydroquinone. The rubber concentrates so-prepared were suitable for use with styrene-acrylonitrile polymers containing about 25 weight percent acrylonitrile and the remainder styrene. Blends of the rubber concentrates and a copolymer of styrene and acrylonitrile containing about 25 weight percent of acrylonitrile and the remainder styrene were prepared and the properties of the rubber concentrates as well as the rubber content, amount of normal octyl mercaptan employed, the graft-to-rubber ratio, viscosity of the ungrafted styrene-acrylonitrile polymer present in the matrix and the percent of acrylonitrile contained therein are set forth in Table IV.

TABLE IV

Rubber Concentrates for Low Acrylonitrile SAN Copolymers

| Ref. | Rubber % | n-Octyl Mercaptan p/100 p Monomer | Graft Rubber | Matrix [η] | AN % | Tensile, psi Yield[1] | Rupture[2] | Modulus psi × 10$^5$ | Notched Izod ft-lbs/in |
|---|---|---|---|---|---|---|---|---|---|
| 11 | 43.3 | 3.0 | .34 | .155 | 34.2 | 3300 | 2360 | 1.4 | 0.49 |
| 12 | 43.3 | 2.0 | .45 | .188 | 33.9 | 3700 | 2800 | 1.5 | 1.2 |
| 13 | 44.9 | 1.0 | .39 | .269 | 32.8 | 3500 | 2700 | 1.6 | 1.5 |
| 14 | 43.6 | 1.0 | .55 | .279 | 33.8 | 3900 | 3000 | 1.7 | 3.4 |
| 15 | 43.2 | 0.5 | .54 | .362 | 28.1 | 3730 | 2950 | 1.7 | 1.3 |
| 16 | 43.2 | 2.0 | .34 | .171 | 30.9 | | | | |

[1]Yield elongation: 3.5 to 3.9%
[2]Elongation at rupture >30%

The rubber concentrates of Table IV were blended with (A) a styrene-acrylonitrile polymer containing about 36.5 percent by weight acrylonitrile and having an intrinsic viscosity of 0.697 deciliter per gram, and (B) a styrene-acrylonitrile polymer containing about 29.7 weight percent acrylonitrile polymerized therein and having an intrinsic viscosity of 0.75 deciliter per gram, both determinations being in a dimethyl formamide solution at 25° C. The results are set forth in Table V wherein the two digits of the Sample No. indicate the rubber concentrate used and the suffix "A" and "B" indicate the styrene-acrylonitrile polymer employed.

TABLE V

| Rubber Concentrate Ref. | Rubber % | Gardner Impact Failed % | Energy in-lbs | Notched Izod ft-lbs/in |
|---|---|---|---|---|
| 11A | 21.7 | 50 | 46 | .82 |
| 11B | 21.7 | 50 | 40 | .66 |
| 12A | 21.7 | 50 | 42 | .89 |
| 12B | 21.7 | 38 | 36 | .68 |
| 14A | 21.8 | 50 | 60 | .89 |
| 14B | 21.8 | 64 | 56 | .84 |
| 15A | 21.6 | 40 | 78 | .96 |
| 15B | 21.6 | 80 | 4 | .62 |

EXAMPLE IV

Rubber concentrates 13 and 16 were blended with commercially available acrylonitrile-butadiene-styrene (ABS) resins designated as C and D, which had different rubber concentrations. Various proportions of rubber concentrate to ABS resin were employed and are indicated in parenthesis in the Column of Table IV wherein the ratio of the ABS polymer to rubber concentrate by weight is set forth.

TABLE VI

Rubber Concentrates for Improving ABS Toughness

| Ref. | Composition | Rubber % | Melt Flow Rate Cond. G. | Notched Izod in ft-lbs |
|---|---|---|---|---|
| | ABSC | 6.0 | 1.45 (1.19) | 1.2 (1.3) |
| | ABSD | 13.5 | 1.16 (.86) | 1.8 (2.0) |
| 13A | ABSD (90/10) | 16.6 | 1.03 | 2.5 |
| 13B | ABSD (80/20) | 19.8 | 1.05 | 6.5 |
| 13C | ABSD (70/30) | 22.9 | 0.92 | 8.0 |
| 13D | ABSC (70/30) | 17.7 | 0.86 | 2.0 |
| 16A | ABSC (70/30) | 17.2 | 1.41 | 1.1 |
| 16B | ABSD (70/30) | 22.4 | 1.41 | 3.1 |
| 16C | ABSC (50/50) | 24.6 | 0.81 | 1.0 |

Values in parenthesis - determinations on granules

EXAMPLE V

Three rubber latexes were prepared in accordance with the procedure of Example I with the following exceptions: a first with a 25 to 75 styrene-butadiene ratio (by weight), wherein the amount of sodium lauryl sulfate added initially was 0.15 part by weight and the amount of tertiary dodecyl mercaptan was 0.1 part by weight. A second rubber latex was prepared with a monomer composition of 25 parts by weight of acrylonitrile, 75 parts by weight of butadiene. This latex employed 0.15 part by weight of sodium lauryl sulfate in the water phase and used 0.1 part by weight of tertiary dodecyl mercaptan. A third polybutadiene latex was prepared using 100 parts by weight of butadiene, 0.2 part of sodium lauryl sulfate and 0.1 part by weight of tertiary dodecyl mercaptan. Using these latexes, rubber concentrates were prepared using the procedure of Example I. The resultant rubber concentrates were blended with an emulsion polymerized acrylonitrile-styrene resin containing about 68% acrylonitrile and 32% styrene and having a solution viscosity of 0.45 deciliter per gram in the 2 to 1 volume mixture of acetonitrile and dimethylformamide at 25° C. The results are set forth in Table VII.

TABLE VII

| Ref. | Rubber Composition % BD | % S | % AN | Graft Rubber | Rubber Particle Size A | Notched Izod 14% R | 22% R |
|---|---|---|---|---|---|---|---|
| 17 | 75 | 25 | — | .165 | 1600 | .54 | 1.25 |
| 18 | 75 | — | 25 | .527 | 1300 | .75 | 1.82 |

TABLE VII-continued

| Ref. | Rubber Composition % BD | % S | % AN | Graft Rubber | Rubber Particle Size A | Notched Izod 14% R | 22% R |
|---|---|---|---|---|---|---|---|
| 19 | 100 | — | — | .215 | 1400 | 1.09 | 3.12 |

EXAMPLE VI

A rubber concentrate was prepared in accordance with the procedure used in preparing the rubber concentrate of Example I with Series A rubbers. Three parts by weight of normal octyl mercaptan was employed in the preparation. A styrene-acrylonitrile latex was provided wherein the polymer contained 68 percent by weight of acrylonitrile, 36 percent by weight of styrene. The polymer had an intrinsic viscosity of 0.45 deciliters per gram as determined in a mixture of 2 parts by volume of acetonitrile and 1 part by volume of dimethylformamide at a temperature of 25° C. Portions of the latexes were admixed in varying proportions to provide levels of rubber in the final product of from 10 to 30 percent. The mixed latex was coagulated with aluminum sulfate at 60° C. and dried in an air oven at 60° C. Molded samples were prepared by milling in the hereinbefore described manner for 5 minutes on 3×8 inch compounding rolls. When milling was completed, molded samples were prepared in the hereinbefore described manner and physical properties determined. The results are set forth in Table VIII.

TABLE VIII

| Ref. | Rubber % | Tensile psi Yield | Rupture | Elong Rupture % | Notched Izod ft-lbs/in | Gardner Impact Failed % | Energy in-lbs | Brabender, 15 min Torque m-gms | Temp. °C. |
|---|---|---|---|---|---|---|---|---|---|
| 20 | 10 | 9300 | 7900 | 21.3 | 0.5 | 66 | 30 | 2200 | 235 |
| 21 | 15 | 8240 | 7000 | 21.7 | 1.6 | 8 | 70 | 2275 | 235 |
| 22 | 22 | | 5600 | 2.4[1] | 3.3 | 0 | 80 | 2275 | 237 |
| 23 | 30 | | 5100 | 7.4[1] | 8.1 | 17 | 80 | 2375 | 239 |

[1]Most specimens failed prematurely due to flaws.

EXAMPLE VII

Two rubber concentrates described in Example II were admixed with a styrene-acrylonitrile polymer containing 50 percent acrylonitrile. The rubber concentrates are identified in the following Table. The rubber concentrates, blends and the styrene-acrylonitrile copolymer were evaluated at 200° C. in an Instron rheometer at a plunger speed of 2 centimeters per minute. The results are set forth in the following Table IX.

TABLE IX

| Polymer | Load kg | True Apparent Shear Rate sec$^{-1}$ | True Visc. Poise × 10$^4$ | Ref. Table |
|---|---|---|---|---|
| SAN copolymer | 502.0 | 200.7 | 2.16 | III |
| R Conc. 8 | 490.7 | 183.3 | 2.31 | III |
| R Conc. 9 | 1058.0 | 198.0 | 4.62 | III |
| 17.5% R Conc. 8 + SAN | 512.0 | 191.2 | 2.31 | III |
| 17.6% R Conc. | | | | |

TABLE IX-continued

| Polymer | Load kg | True Apparent Shear Rate sec$^{-1}$ | True Visc. Poise × 10$^4$ | Ref. Table |
|---|---|---|---|---|
| 9 + SAN | 66.0 | 202.6 | 2.85 | III |

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An improved rubber concentrate for the preparation of rubber reinforced copolymers containing styrene and acrylonitrile, the rubber concentrate comprising a plurality of grafted diene-rubber latex particles having chemically attached thereto an attached styrene-acrylonitrile polymer, the attached styrene-acrylonitrile polymer being in admixture with a matrix copolymer of acrylonitrile and styrene at least approximating the chemical composition of the attached styrene-acrylonitrile polymer, with the further limitation that the matrix copolymer of acrylonitrile and styrene, chemically unattached to the diene rubber, has an intrinsic viscosity of from about 0.15 to about 0.5 deciliters per gram as determined in a solution of a 2 to 1 by volume mixture of acetonitrile and dimethylformamide at 25° C., and the number average diameter of the diene-rubber particles lie between about 500 Angstroms and 2800 Angstroms and that the ratio of the chemically attached or graft styrene-acrylonitrile polymer to diene rubber lie between about 0.1 and 1.0 with the further limitation that the styrene-acrylonitrile of the attached and chemically unattached polymer contains from about 50 to 75 parts by weight of acrylonitrile and 50 to 25 parts by weight of styrene.

2. The rubber concentrate of claim 1 wherein the diene rubber particles have a number average diameter of from about 500 to 1500 Angstroms.

3. The rubber concentrate of claim 2 wherein the ratio of graft stryene-acrylonitrile polymer to diene rubber is from about 0.1 to 0.6.

4. The rubber concentrate of claim 1 in intimate admixture with a polymer containing polymerized therein from 50 to 75 parts by weight acrylonitrile and 50 to 25 parts by weight styrene.

5. The rubber concentrate of claim 4 wherein the diene rubber particles have a number average diameter of from about 500 to 1500 Angstroms.

6. The rubber concentrate of claim 4 wherein the ratio of graft styrene-acrylonitrile polymer to diene rubber is from about 0.1 to 0.6.

* * * * *